Patented Apr. 5, 1938

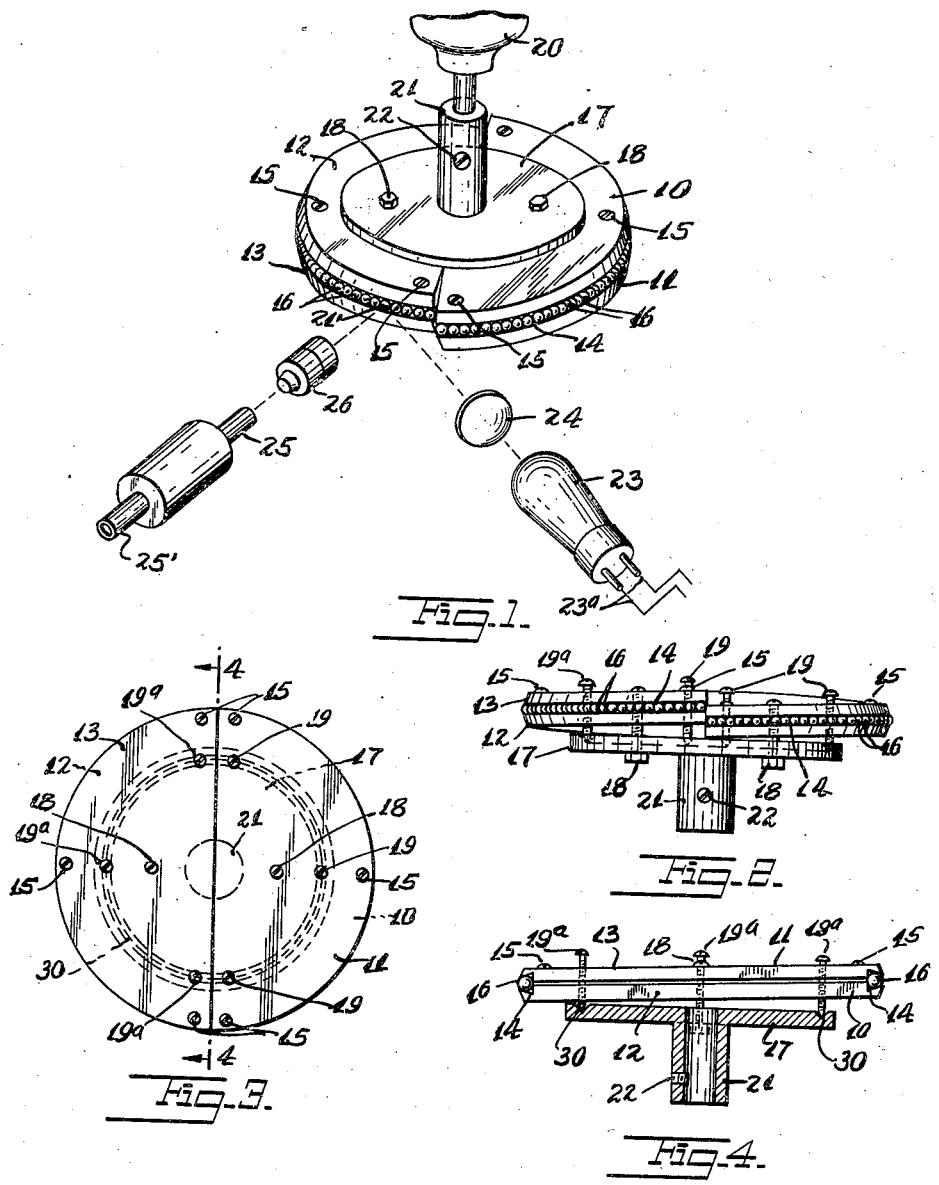

2,113,411

UNITED STATES PATENT OFFICE 2,113,411

SCANNING DEVICE

Saul Schiller, New York, N. Y.

Application March 12, 1937, Serial No. 130,463

7 Claims. (Cl. 178—7.6)

This invention relates to new and useful improvements in an interlaced ball drum scanner for television device.

The aim of this invention is the construction of a mechanical drum scanner, an optical device in which reflection balls are self-aligned in the rim ways of half, circular plates and viewable when looking at the periphery.

With due respect to the ingenuity which has been devoted to the cause and developments of the mechanical scanning systems, e. g. lens discs, mirror wheels, etc., it is well known to those skilled in the art that in view of the multi-hundred line structure of an electronic scanner, it is discouraging to persist in former construction methods. The application of existing methods to a multi-hundred line scanner would result in (1) impractical large revolving parts for home use (2) high cost of scanner due to hundreds of expensive optical components on the disc or drum (3) intricate machining of scanner; and individual hand alignment of optical components (4) a low ratio of received light intensity to that of the emitting light source.

The first object which characterizes this invention is the preparation of a double helix. It is based on the geometrical concept that the division of a circular plate on its diameter provides two identical half circular plates. If the diameters of these two half plates be in contact edge for edge, and then tilted on its former common center so as to form angles, the resulting figure will have the shape of a double helix.

Now the mechanism of interlaced scanning wherein the scanning field is covered twice per single rotation depends, in the case of a rotating flat disc, on the double spiral; and in the case of a rotating drum on a double helix. On the relative merits of single helix scanning in which the field is completely explored from "top to bottom", "left to right in continuous sequence per single rotation"; or the double helix in which the field is half explored from "top to bottom, left to right alternate sequence per one half rotation against top to bottom left to right—fill in blank strips on second half of rotation", I will not elaborate.

The second object of this invention involves the elimination of hand-setting or individual alignment of the optical elements in the carrier, and simultaneously the introduction of inexpensive spherical shaped reflecting mirrors. The basis of this concept is mechanical and optical and is explained more fully below.

A method of graduating a circular plate is to turn a groove or rim way near the periphery of the plate, and allow steel balls to rest on this circular track. When the balls are arranged on this track, and just contact each other, the number of degrees subtended between two contact points can be expressed as $360/n$, where $n$ represents the number of balls which have been accommodated into the pre-calculated track. Those skilled in the machine and machine-tool art deem this indexing method reliable by virtue of the amazing close tolerance exhibited by lapped steel balls. The extreme accuracy of high grade, polished steel balls is equal to reference gauges, tolerances.

Optically, the smooth, polished steel spherical surface can be considered a convex mirror. When coated with a metal film under vacuum deposition the percentage of light reflected is increased.

The third object of this invention introduces a microscopic method of enlarging the field generated by the scanner. Optical amplification via the microscope represents a departure from conventional projection scanning systems.

Now the structure of the scanning field does not lose its identity because it is reduced in size. Its line characteristics are preserved up to the limits where destructive interference between two lines takes place. In this ball drum scanner, I advocate that the drum frame, i. e., the horizontal and vertical dimensions, be confined to an area accommodated by the objective of a microscope. By virtue of the resolving power of the microscope, two adjacent luminous points of light on the balls will be widely separated. Moreover, by virtue of the reducing powers of the ball reflecting surfaces, it is possible to secure this angular magnification without the usual concurrent object to image ratio of magnification. The practical application of this optical property is important because it permits the use of a large light source, an aperture whose size is, not a function of the vertical increment.

The fourth object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective schematic view showing the ball drum scanner constructed according to this invention and its relation to its optical accessories, the light source and microscope.

Fig. 2 is a side elevational view of the scanner drum.

Fig. 3 is a face view of the scanner, the dotted lines indicating the back.

Fig. 4 is a sectional view of the scanner in the direction of 4—4 of Fig. 3.

The ball drum scanner consists of a disc formed by four identical half circular plates 10, 11, and 12, 13, each having their own peripheral groove. The half circles are paired, placed in face contact and clamped together by machine screws 15. The rim ways 14, thus formed are filled with a plurality of balls 16 from either end opening, and are retained because the walls of the rim ways have tapered side walls. The twin paired half circular plates 10, 11 and 12, 13, are centered on the support disc 17 and attached thereto by machine screws 18.

Each paired half circles 10, 11 and 12, 13 carry three leveling screws 19 and 19a. Fig. 3 shows the circumferential arrangement of the screws 19 and 19a and Fig. 4 shows how the screws 19 and 19a contact the support disc in a groove 30 whose circumference is the same as that on which the levelling screws are located.

Since three points determine a plane, plates 10, 11 and 12, 13 can rest in any plane with respect to the support disc merely depending on the adjustment imparted to the levelling screws. To effect a double helix, the levelling screws are adjusted so that the diameters of the half discs which are in contact assume angles.

For example, if a four to three frame aspect is desired, the unit four is known. It is the diameter of the balls. The pitch of the thread is rendered 75% of this value by raising and lowering the discs by means of the levelling screws.

Half disc 12, 13 contributes lines 1, 3, 5, etc. and disc 10, 11 contributes lines 2, 4, 6, etc. in the scanning frame.

For the observation of this scanning frame, the ball drum scanner is mounted on a synchronous motor 20. The hub 21 carries a set screw 22 which locks the device on the motor shaft. The rays of a point source of light, a crater lamp 23, are focused on two adjacent balls 21 by means of collecting lens 24. The images reflected from the mirror surfaced balls are brought to a focus in the plane of the objective 25 with the aid of microscope condenser 26. On looking through eyepiece 25', examination reveals that the original source appears as two illuminated spots widely separated in the microscope field but unmagnified.

The microscope field pattern observed when the disc is revolving is a plurality of uniformly illuminate and spaced lines.

Other pre-requisite steps for the reception of the television images include a television signal, input circuit 23a to the light source and a motor 20 whose synchronous speed will provide the same number of frames per second to the receiving scanner as that being transmitted.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A ball drum scanner for television reception comprising a plate, disc sections clamped on said plate, means for holding said disc sections inclined to simulate a helix, rim ways formed on the peripheries of said disc section, and reflection balls mounted in said rim ways.

2. A ball drum scanner for television reception comprising a plate, disc sections clamped on said plate, means for holding said disc sections inclined to simulate a helix, rim ways formed on the peripheries of said disc section, and reflection balls mounted in said rim ways, there being a right hand superimposed pair of half circular plates forming one disc section and an adjacent left hand superimposed pair of half circular plates forming another disc section.

3. A ball drum scanner for television reception comprising a plate, disc sections clamped on said plate, means for holding said disc sections inclined to simulate a helix, rim ways formed on the peripheries of said disc section, and reflection balls mounted in said rim ways, there being a right hand superimposed pair of half circular plates forming one disc section and an adjacent left hand superimposed pair of half circular plates forming another disc section, and said disc sections being adjustable relative to each other and the axis of the disc for changing the pitch of the helix.

4. In a ball drum scanner for television reception, a scanner disc of several sectors, rim ways on the circumference of each sector into which reflector balls are placed and self-aligned, said sectors being in different planes at slight angles to each other so that the parts of said rim ways of said sectors form a multiple helix, and means for holding said sectors at various different inclinations to each other to change the pitch of said helix.

5. In a ball drum scanner for television reception, a scanner disc of several sectors, rim ways on the circumference of each sector into which reflector balls are placed and self-aligned, said sectors being in different planes at slight angles to each other so that the parts of said rim ways of said sectors form a multiple helix, and means for holding said sectors at various different inclinations to each other to change the pitch of said helix, comprising a support disc upon which said sectors rest, three levelling screws threadedly engaged through each of said sectors and engaging the top face of said support disc, so that said sectors may be adjusted to assume various positions with relation to each other and the top face of said support disc by changing the various adjustments of said levelling screws.

6. In a ball drum scanner for television reception, a scanner disc of several sectors, rim ways on the circumference of each sector into which reflector balls are placed and self-aligned, said sectors being in different planes at slight angles to each other so that the parts of said rim ways of said sectors form a multiple helix, and means for holding said sectors at various different inclinations to each other to change the pitch of said helix, comprising a support disc upon which said sectors rest, three levelling screws threadedly engaged through each of said sectors and engaging the top face of said support disc, so that said sectors may be adjusted to assume various positions with relation to each other and the top face of said support disc by changing the various adjustments of said levelling screws, said levelling screws being arranged on an arc and having pointed ends engaging into an arcuate V-shaped groove in said support disc, the arc of said screws and the arc of said groove being identical in shape and arranged in super-imposed aligned positions, and means for attaching said sectors to said support disc.

7. In a ball drum scanner for television reception, a scanner disc of several sectors, rim ways on the circumference of each sector into which reflector balls are placed and self-aligned, said sectors being in different planes at slight angles to each other so that the parts of said rim ways of said sectors form a multiple helix, and means for holding said sectors at various different inclinations to each other to change the pitch of said helix, comprising a support disc upon which said sectors rest, three leveling screws threadedly engaged through each of said sectors and engaging the top face of said support disc, so that said sectors may be adjusted to assume various positions with relation to each other and the top face of said support disc by changing the various adjustments of said levelling screws, said levelling screws being arranged on an arc and having pointed ends engaging into an arcuate V-shaped groove in said support disc, the arc of said screws and the arc of said groove being identical in shape and arranged in super-imposed aligned positions, and means for attaching said sectors to said support disc, comprising a bolt for each of said sectors, and each bolt passing freely through aligned openings in said sector and said support disc for holding said sector and said support disc with said levelling screws engaging into said groove.

SAUL SCHILLER.